S. E. FOSTER.
Carriage-Coupling.

No. 168,246. Patented Sept. 28, 1875.

Witnesses.
F. B. Townsend.
Phil H. Moxon

Inventor.
Stephen E. Foster
per Attys
A. H. Evans & Co.

UNITED STATES PATENT OFFICE.

STEPHEN E. FOSTER, OF MINNEAPOLIS, MINNESOTA.

IMPROVEMENT IN CARRIAGE-COUPLINGS.

Specification forming part of Letters Patent No. 168,246, dated September 28, 1875; application filed August 26, 1875.

*To all whom it may concern:*

Be it known that I, STEPHEN E. FOSTER, of Minneapolis, Minnesota, have invented certain new and useful Improvements in Carriage-Couplings, of which the following is a full, clear, and exact description, reference being had to the accompanying drawings making a part of this specification, in which—

Figure 1:
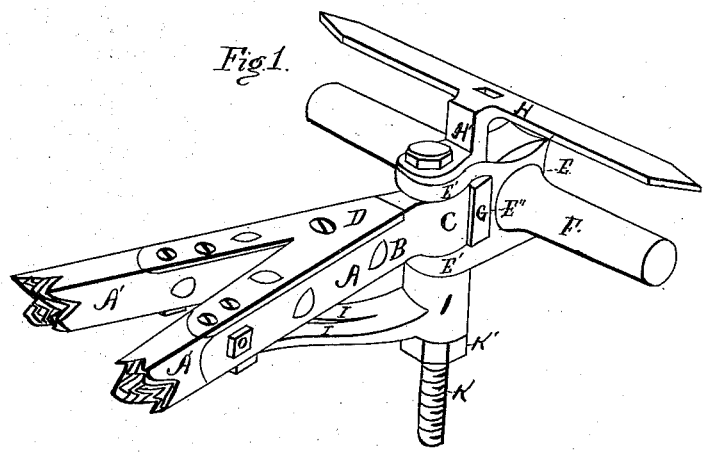
Figure 2:
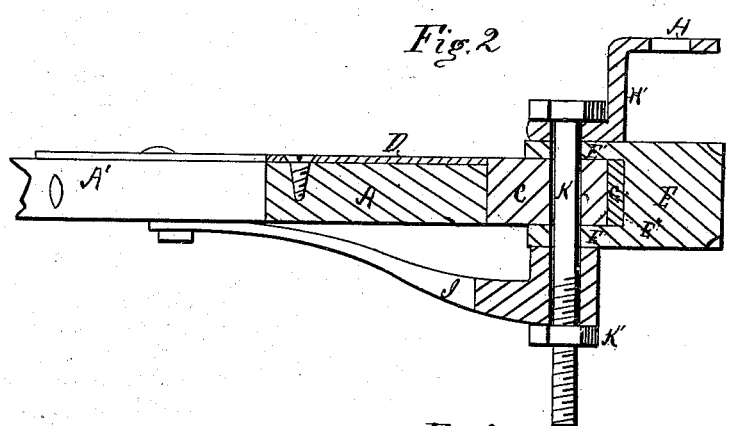
Figure 3:
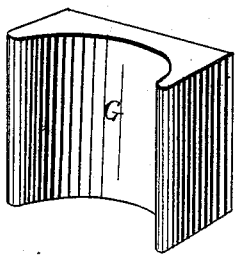

Figure 1 is a perspective view of a carriage-coupling with my improvement applied thereon. Fig. 2 is a vertical section. Fig. 3 is a detached view of the rubber or elastic pad.

My invention relates to that class of carriage-couplings in which a rubber or other elastic material is employed to prevent corrosion, and by which the coupling is made perfectly noiseless; and it consists in the arrangement and combination of parts hereinafter described and claimed.

To enable others skilled in the art to make and use my invention, I will proceed to describe the exact manner in which I have carried it out.

In the said drawings, A represents the reach, the arms A' A' of which are connected together by means of a brace-piece, B, terminating in an eye or loop, C, and an A-shaped plate or cap, D. The loop or eye C is received and held between the lugs or projections E' of the coupling E, which is welded onto and forms part of the axle F. The axle F is bowed from the center toward the wheel, so as to throw the greater portion of the weight toward the extremities. Between the eye or loop C and the face E'' of the axle F I place an elastic pad, G, formed of rubber or other suitable material. H is a rest, on which the body is supported, and which is held to the upper surface of the coupler E by means of a bent arm, H'. I I are a pair of braces connected at one end to one of the arms A' of the reach A, while at their opposite ends they are welded together into the form of a loop or eye, 1. K is a coupling-bolt passing down through the bent arm H', lugs E', loop C, and loop or eye 1, and, by means of the nut K', firmly connecting the whole together.

By this construction of the couplings of vehicles it will be readily seen that by the employment of the double braces H H the strength of the reach is greatly increased, and by welding the coupler E to the axle F I also secure a firm and strong attachment, avoiding the weakening of the axle, as is the case when the coupler is connected to the same by passing bolts or rivets therethrough.

It will also be evident that by employing the elastic pad G between the eye or loop C and the face E'' of the axle F the corrosion of the parts of the joint is avoided, and all noise prevented.

Having thus described my invention, what I claim as new, and desire to secure by Letters Patent, is—

1. The combination, with the reach A, eye C, coupler E, and bolt K, of the double brace I I, and rubber pad G, substantially as and for the purpose set forth.

2. The combination, with a bowed axle F, having a coupler, E, welded thereon, of the reach A, eye C, rubber pad G, plate D, double brace I I, and bolt K, constructed to operate substantially as shown and described.

In testimony that I claim the foregoing, I have hereunto set my hand.

STEPHEN E. FOSTER.

Witnesses:
W. J. RAYMOND,
VERNON BELL.